United States Patent [19]

Zimmerman et al.

[11] Patent Number: 5,503,360
[45] Date of Patent: Apr. 2, 1996

[54] ADJUSTABLE POSITIONING DEVICE

[75] Inventors: Keith A. Zimmerman, Seven Valleys; John F. Smith, Hanover; John D. Stein, Dover, all of Pa.

[73] Assignee: FMC Corp., Chicago, Ill.

[21] Appl. No.: 238,410

[22] Filed: May 5, 1994

[51] Int. Cl.[6] ................................................. F16M 13/00
[52] U.S. Cl. ........................... 248/558; 248/678; 411/535
[58] Field of Search ................................ 248/558, 678, 248/674, 677, 676, 913, 419, 183; 411/535, 536, 546, 537, 538

[56] References Cited

U.S. PATENT DOCUMENTS 1,893,699  1/1933  Dunning ............................. 248/678 X
4,700,922  10/1987  Gross ................................. 248/558
5,110,082  5/1992  Rowan, Jr. ......................... 248/678
5,160,238  11/1992  Kambara .......................... 248/913 X Primary Examiner—Ramon O. Ramirez

[57] ABSTRACT

This disclosure relates to a device which enables adjustments and positioning in three dimensions for racks and other bulk stowage structures. A friction surface provides a sliding adjustment for stowage structures having surfaces in contact therewith. Further, a pin connected to a spacer is slidably inserted into a button base to enable vertical adjustments for raising and lowering the stowage structure, as needed, by adding or removing shims thereon.

5 Claims, 1 Drawing Sheet

U.S. Patent Apr. 2, 1996 5,503,360
FIG_1
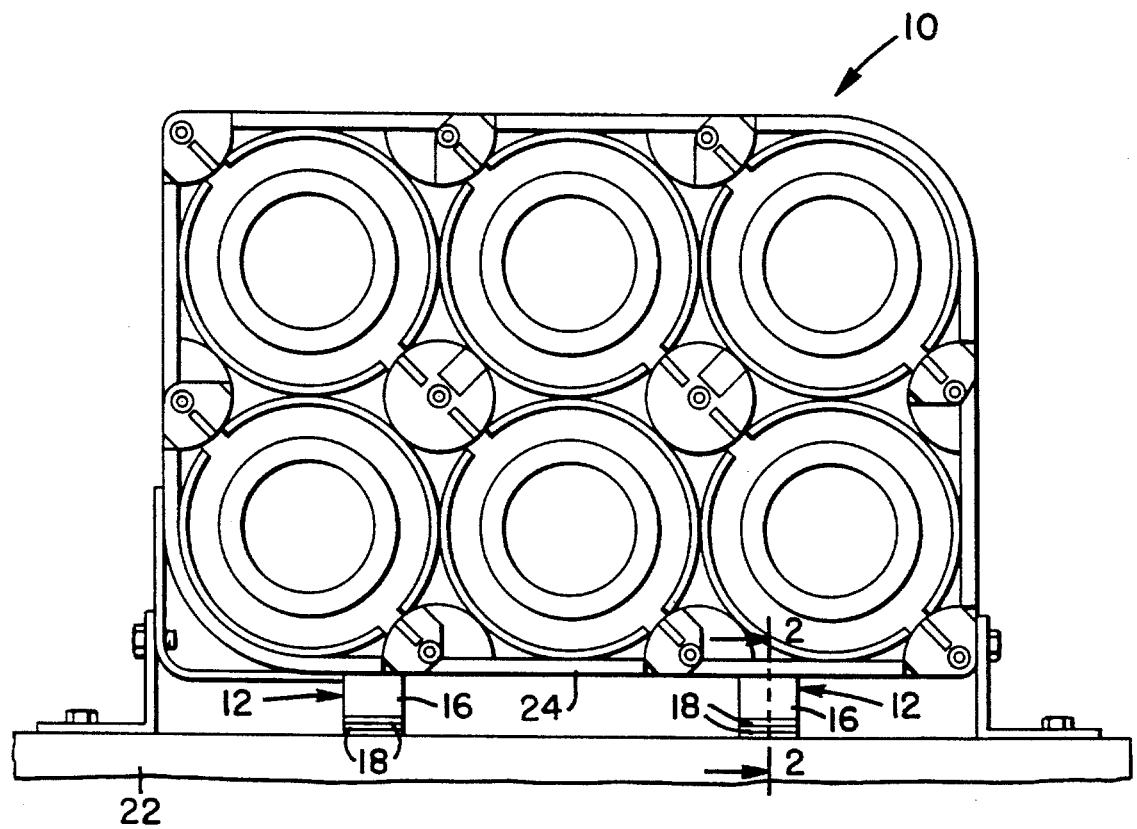
FIG_2
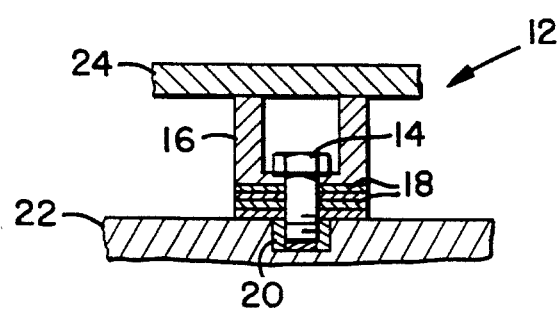

ADJUSTABLE POSITIONING DEVICE

FIELD OF THE INVENTION

The present invention deals with a device particularly suited to provide support and orientational adjustment in a vertical direction, while allowing substantial freedom of movement in lateral directions, for load bearing structures.

SUMMARY OF THE INVENTION

This invention relates to a device which enables both vertical and horizontal adjustments to positioning of racks and similar load containers and support structures. It is particularly suited to material stowage where the support structure is subject to a wide range of movement to attain proper positioning.

BRIEF DESCRIPTION OF THE DRAWINGS

FIG. 1 is an elevation side view of a load rack with the support provided by the adjustable positioning device of the present invention.

FIG. 2 is a section taken along lines 2—2 of FIG. 1, showing the adjustable positioning device and connections.

DESCRIPTION OF THE PREFERRED EMBODIMENT

Referring to FIG. 1, the preferred embodiment is disclosed supporting a rack 10. Adjustable positioning device 12 is in contact with the bottom of rack 10.

Referring now to FIG. 2, adjustable positioning device 12 is shown in detail. Screw 14 is inserted through cup-shaped rest button 16 and shims 18. Screw 14 is threadably attached into the mounting surface 20. Mounting surface 20 is fastened to substructure 22. Screw 14 provides lateral restraining support for the positioning device while allowing rest button 16 freedom of movement in the vertical direction. Rest button 16 provides direct vertical support and contact with rack bottom 24.

The description hereinabove relates to some of the most important structural features which set and determine the operational parameters for the adjustable positioning device. The operation of the device under a best mode consideration is described hereinbelow.

Referring to FIGS. 1 and 2, the bottom of rack 10 is supported by cup-shaped rest button 16 and shims 18. Screw 14 can be of a variable length so as to allow for a great range of adjustments. However, it can be of a fixed length and still allow a wide range of adjustability since the head of the screw does not necessarily have to tighten against rest button 16. Some of the most significant advantages of the present invention include positioning and adjustability in three directions. An increment or decrement of shims 18 enables a corresponding higher or lower leveling of rack bottom 24. Further, since screw 14 is slidably connected to cup-shaped spacer 16, vertical positioning of the rack can be adjusted without regard to the final position of the head screw 14, correspondingly depending on whether shims 18 are added or taken out. Furthermore, rack bottom 24, positioned on rest bottoms 16, forms friction plane f to enable lateral and longitudinal adjustment and frictionally glides over rest buttons 16.

This invention is particularly useful for situations in which the threaded area of mounting surface 20 is limited to a shallow depth. It is possible to use a single specified length of screw 14 and achieve a significant range of adjustability even though there is minimal adjustability to the positioning of screw 14 itself.

Accordingly, the present invention enables ease of adjustment and positioning for racks and other types of load bearing structures.

While a preferred embodiment of the adjustable positioning device has been shown and described, it will be appreciated that various changes and modifications may be made therein without departing from the spirit of the invention as defined by the scope of the appended claims.

what is claimed is:

1. An adjustable positioning device for load rocks and similar structures comprising:

a plurality of spacers each having at least one surface and further having a base;

a pin extending through said spacer base;

a button securely fastened to a support base;

said pin threadably attached to said button;

shims disposed between said spacer and said support base;

said spacer surface providing direct contact with the load racks and further enabling lateral and longitudinal orientation of the load racks; and said at least one surface forming a friction plane with the load racks and said similar structures for adjustment.

2. The device according to claim 1 wherein said spacer surfaces includes planer contact with said shims disposed between said spacers and said support base to enable a combination of vertical, lateral and longitudinal orientation of the load racks.

3. A laterally and longitudinally adjustable positioning device for load racks and similar structures comprising:

a plurality of spacers each having a least one surface and further having a base;

a pin extending through said spacer base;

a button securely fastened to a support base;

said pin threadably attached to said button;

shims disposed between said spacer and said support base;

said spacer surface including a friction plane in contact with the load racks and enabling lateral and longitudinal adjustment of the load racks; and said at least one surface forming said friction plane.

4. The device according to claim 3 wherein said shims are load bearing and are individually removable and replaceable and cooperate with said spacer surface to enable a combination of vertical, lateral and longitudinal orientation of the load racks.

5. A device for three dimensional adjusting and positioning of racks and similar load container comprising:

a plurality of spacers with a base having frictional surfaces to form a friction place at points of contact between said spacers and said racks and said similar load containers;

said spacers having a friction surface in planar contact with said load containers to enable lateral and longitudinal adjustment of said load containers;

a pin with a threaded end extending through said base of said spacers;

a button securely fastened to a support base;

said threaded end of said pin attached to said button; and load bearing shims disposed between said spacer and said support base.

\* \* \* \* \*